J. S. HOOTON.
Bee Hive.
No. 79,471.
Patented June 30, 1868.
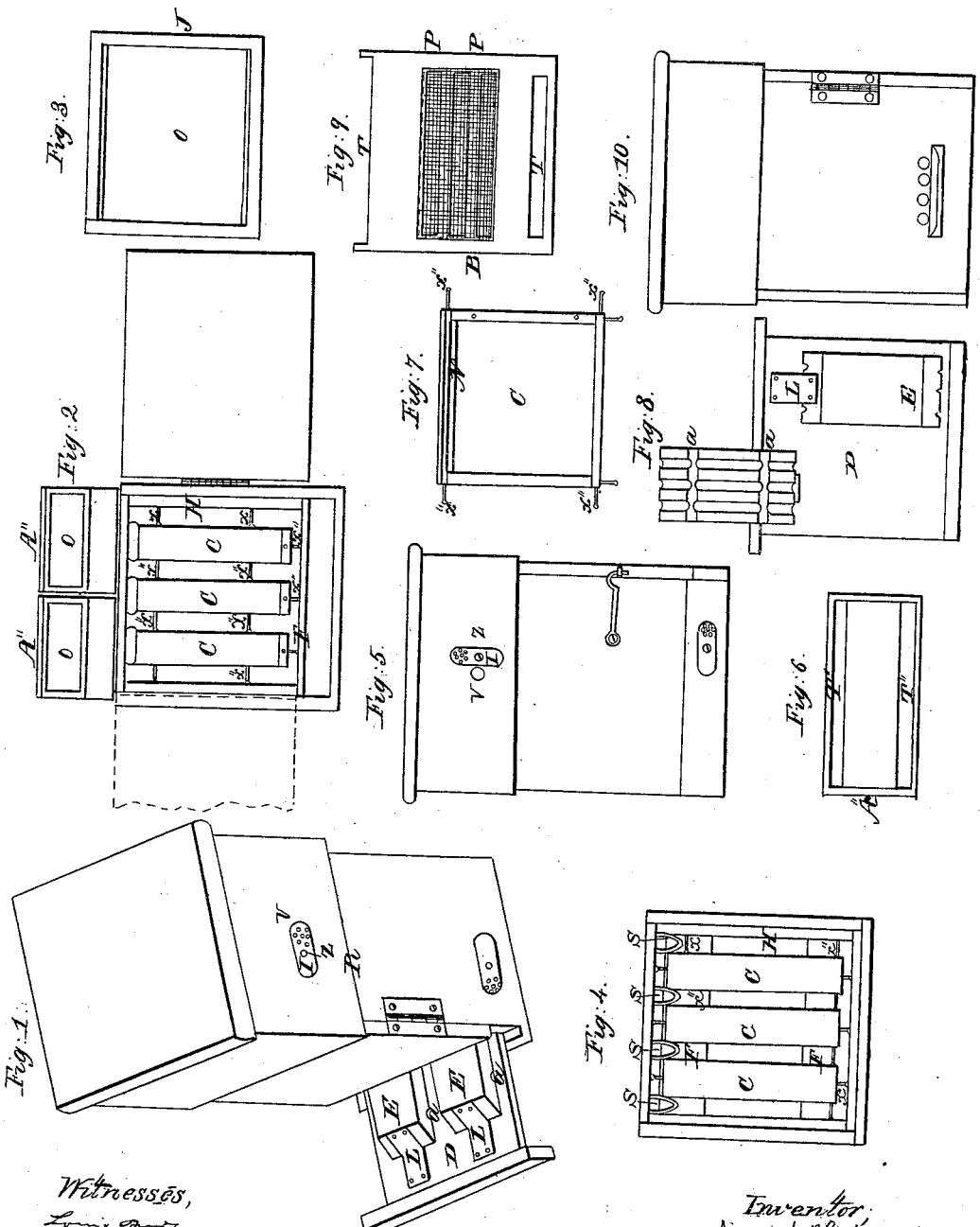

UNITED STATES PATENT OFFICE.

JAMES S. HOOTON, OF NEW CARLISLE, INDIANA.

IMPROVEMENT IN BEE-HIVES.

Specification forming part of Letters Patent No. 79,471, dated June 30, 1868.

*To all whom it may concern:*

Be it known that I, JAMES S. HOOTON, of New Carlisle, St. Joseph county, in the State of Indiana, have invented a new and Improved Mode of Making Houses or Hives for Bees; and I do hereby declare the following is a full and exact description thereof, reference being had to the accompanying drawings, and to the letters of reference thereon marked.

The nature of my invention consists in so constructing the outside of the hive as to make it easy of access to any part thereof; to give perfect ventilation in warm weather and in cool weather; to shut off ventilation entirely, or sufficiently to keep the hive warm inside and to prevent the bees from suffering with either heat or cold; also, to prevent the destruction of the bees or of the honey by the miller or worm; and, further, to enable persons to remove the honey from any portion of the hive in small quantities, if desired, without interfering with any other portion of the hive.

To enable others to understand my invention, I will proceed to describe it, referring to the letters and figures on the drawings to give a complete understanding thereof.

I make my hive of any material, generally of wood, and of any size that may be desired.

The box, or the outside, is made in two parts. Two sides of the lower part are made stationary, and are nailed or screwed together at the corner, standing at right angles. To the opposite side or edge of these stationary pieces I fasten the other two sides by hinges, so fixed as to close and make a square box, the hinged sides meeting at the corner or angle opposite the angle made by the stationary sides, and there fastened by a hook or hasp and staples, or in any other manner.

In the bottom of this box I make a drawer, (see Figure 1, marked D, also Fig. 8, marked D,) so made as to slide out and in at will. In the bottom of this drawer, attached to the bottom board by leather hinges, marked L in Figs. 1 and 8, I place two pieces of wood, marked E, of proportionate size and thickness, as represented in the drawings. On the under side of these pieces I cut grooves, running across each other at right angles, of the depth of one-fourth of an inch. These pieces of wood, lying flat on the bottom of the drawer, with the grooved side down, leave openings under them, marked thus, a, in Figs. 1 and 8, into which the worm will crawl; and a little attention given to raising the pieces and killing the worms will prevent any mischief being done by them.

This drawer is made to open on the back side, or the side opposite to where the bees enter the hive, and beneath the entrance, so that the opening of the drawer does not disturb the bees in their labor.

The openings for the entrance of the bees I make in one of the stationary sides of the hive, and place a little block or step underneath it, as shown in Fig. 10. The opposite side of the hive being hinged, enables it to be opened without interfering with the ingress or egress of the bees.

In the lower part, and just above the drawer, as above described, I place two slats or rails of wood, marked F in Figs. 2 and 4, on which the comb-racks C C C are to rest. I then place up against the side of the hive that is stationary, and that stands at right angles with the side in which are made the holes for entrance of the bees, a thin board. (Represented in Fig. 2, and marked H.) This is merely placed in the hive, and is held there by the comb-racks C C C, as will more fully appear hereinafter. Its purpose is to prevent the bees from waxing or building the comb fast to the side of the hive, thus making it difficult to remove the comb. This board is removed with the comb-rack that stands next it, and, when the honey-comb is severed, can be replaced without difficulty or disturbance to the bees.

In the front of this board are two metal pins, marked X, Figs. 2 and 4. Against the pins the comb-rack C is placed. These pins extend out one-fourth to three-eighths of an inch, just far enough to give the bees room to go between the board and the edge of the comb-rack.

I next make the comb-rack C, of which there may be as many as are desired. These I construct of wood, made, as indicated in Fig. 7, a square frame of such size and width as to fill up the space left for them. In each end of each rack, a short distance from the corner, as shown in Fig. 7, and also in the left-hand edge of the front end of each rack, as seen in Fig. 4, I place the metal pins marked X″ in Figs. 2 and 4, not more than three-eighths of an inch in length. The object of these pins is to fully support the racks, and yet have them touch no wood, as everywhere the pieces of wood are brought together the bees will wax them fast, and compel the severing of the wax before the racks can be removed. By the use of these pins I prevent the racks from being waxed fast to each other or to any other part of the hive.

The pins must be of sufficient length to allow the bees to go between the racks, and between them and the sides of the hive, but not long enough to allow the bees to deposit any comb, and still leave room to pass in the spaces. Besides these pins, I have, for the support of the rack, and to enable them to be easily removed, small metal staples, (shown in Fig. 4,) marked S. These staples are in two rows across the inside of the front part of the hive, and in perpendicular rows or lines, and serve to keep the racks a proper distance apart when the racks are in place, and to support them. Being of metal, the bees will not wax the racks fast to them. They are made tapering, so that by drawing the racks forward a little enough space is given to carry the front end of the rack outward and to the left hand, that side of the hive being hinged and open.

The racks can all, or any number of them, be so carried to the left at the front end, and thus open to inspection both sides of any one or all of the racks, if desirable; also permit the removal of any one of them and replacing it without difficulty. These points are all fully shown in Figs. 2 and 4.

Outside of these racks, and next to the outside of the box, supported by the metal pins mentioned, I place on the two sides that are open sash, marked J in Fig. 3, with a glass, marked O, in each, which enables me to see at any time when the racks are full. Above and on top of these I place a thin board, marked B, (shown in Fig. 9,) covering the whole top, but with openings cut in it, and shown in Fig. 9, marked T and P. The openings T communicate with the lower part of the hive, and are made to correspond with the openings in the honey-cap A″, Fig. 6, marked T″. These honey-caps A″ are placed on the top of the board B, and the openings T T′ allow the bees to pass up from the lower hive into the cap. Near the center of this thin board B will be seen the openings P, which are covered on the lower side of the board B with wire-cloth, (shown in Fig. 9,) so as to prevent the bees from passing into them, but so as to allow the air to pass for ventilating purposes. There are three of these. The two outer ones of the three are intended to communicate with the openings T″ in the honey-cap A″, Fig. 6, and the middle one is intended to allow the air to pass from one part of the hive to the other for ventilating purposes when the honey-caps are placed a little way apart, as they can be. In one end of these caps A″, I place a glass, o, in Fig. 2, to enable any one to know when they are filled. Over the whole is placed the top part of the hive, which is made a square box, with a top, open at the bottom, and with a rabbet in the inside of the lower edge, making it sufficiently large to sit down over the lower box the depth of the rabbet, and make the hive close and tight.

On the two sides of the upper part of the hive, also on the same sides of the lower part of the hive, down below the part that swings on hinges, and opening into the drawer in the bottom, I bore holes, (marked V,) one through each side of both parts of the hive, to be used for ventilating purposes.

On the outside of the box, and near each of these holes, I fasten a metal strip about five inches long and one and a half inch wide, (shown in Figs. 1 and 5,) marked I, by means of a common wood-screw, marked Z, passing through the center of the strip, and screwed tight enough to prevent its turning by the weight of the metal strip, but so that the strip can be turned either way. One end of this metal plate I perforate, taking care to make the holes so small that insects cannot go through them. The other end of the strip I leave solid, and by means of this I temper the hive. During warm weather I turn the perforated end of the metal strip over the holes, and this allows fresh air to pass in at the lower holes and drive the warm air out at the upper ones. In cool weather I reverse the metal strip, thus closing the circulation.

To make the circulation complete, care should be taken to place the honey-caps apart, and, when it is desired to prevent circulation, place them close together.

Fig. 1 shows the hive R open for ventilation, and with the miller-drawer partly out. Fig. 2 shows the hive with the top part removed, showing the honey-caps A″. Fig. 6 shows a sectional view of the honey-cap A″, with the openings T″, being the bottom of the honey-cap. Fig. 7 represents the comb-rack C, with the metal staples X″.

In Fig. 7, N represents the comb-guide, which is nailed to the under side of the top piece of the comb-rack C, and running the whole length of the inside of the rack from front to back.

Fig. 9 represents the board B, with the opening in it, marked T and P, also the wire-cloth over the openings P. Fig. 8 represents the drawer for the bottom of the hive, marked D, with the pieces of wood E, and shows the grooves a and the leather hinges L, all in the manner and for the purposes specified.

What I claim as my invention is as follows:

1. The device for entrapping the worms, as specified.

2. Supporting the racks by the metal staples S, as shown and specified.

3. Supporting and holding to their places the racks by means of the metal pins X'', as specified.

4. Supporting the racks solely upon metal bearings by means of the pins X and staples S, as set forth.

5. The hive R, when its several parts are constructed, combined, and arranged as set forth.

6. Board B, when constructed as specified.

7. The combination of the metal strip I'', the screw Z, the aperture V, the openings P and T through the board B, with the wire-cloth, as set forth, and for the purposes specified.

JAMES S. HOOTON. [L. S.]

Witnesses:
W. E. HIGGINS,
H. McMUNDAY.